United States Patent [19]

Karass et al.

[11] 4,022,863
[45] May 10, 1977

[54] POLYMER PLASTIC STRAPPING FROM POLYETHYLENE TEREPHTHALATE

[75] Inventors: Thomas J. Karass, Mount Royal; Anh D. Nguyen, Longueil; Paul Vegvari, St. Eustache, all of Canada

[73] Assignee: Caristrap Corporation, Chomedey, Canada

[22] Filed: June 4, 1975

[21] Appl. No.: 583,630

[52] U.S. Cl. .................... 264/210 R; 24/16 R; 24/30.5 P; 260/75 T; 264/288; 264/290 T; 264/DIG. 65; 264/DIG. 78
[51] Int. Cl.² ......................................... B29D 7/24
[58] Field of Search .......... 24/206 A, 17 AP, 16 R, 24/16 PB, 30.5 P; 264/210 R, 176 R, 178 R, 290 T, 37, 288, 146, 147, DIG. 65, DIG. 73, DIG. 78; 34/12, 60; 425/376–378; 260/75 T

[56] References Cited
UNITED STATES PATENTS

| | | | |
|---|---|---|---|
| 3,036,335 | 5/1962 | Heston et al. | 264/102 |
| 3,283,378 | 11/1966 | Cramton | 24/16 PB |
| 3,290,420 | 12/1966 | Orser | 264/210 R |
| 3,354,023 | 11/1967 | Dunnington et al. | 264/210 R |
| 3,411,215 | 11/1968 | Fields | 34/12 |
| 3,447,207 | 6/1969 | Danzer | 264/210 R |
| 3,470,288 | 9/1969 | Dunnington et al. | 264/210 R |
| 3,547,890 | 12/1970 | Yamada et al. | 260/75 T |
| 3,582,453 | 6/1971 | Sloan et al. | 24/16 PB |
| 3,627,579 | 12/1971 | Heffelfinger | 260/75 T |
| 3,651,196 | 3/1972 | Starkweather, Jr. | 264/288 |
| 3,746,608 | 7/1973 | Takahashi | 24/16 PB X;16 PB |

Primary Examiner—Jeffery R. Thurlow

[57] ABSTRACT

The present invention relates to plastic extruded strapping and its processing techniques. More particularly, it is concerned with polyester extruded strapping of high tensile strength and low elongation at break to replace steel strapping. Although not limited thereto, this invention is of primary importance in connection with the technique of crystallization and orientation of polyester predominantly in one direction in the making of strap characterized by two-step stretching. Furthermore, this invention is related to the design of a multipurpose extrusion line for the processing of strap of various polymeric materials.

2 Claims, 5 Drawing Figures

POLYMER PLASTIC STRAPPING FROM POLYETHYLENE TEREPHTHALATE

This invention relates to plastic strapping and, more particularly, to a method and system for producing plastic strapping of the type used in the packaging art.

Extruded plastic strapping of polypropylene and polyamide base materials has become increasingly important in the packaging business in the past decade, primarily because of their low cost of manufacture and their outstanding properties as compared to steel strapping, such as the ability to absorb shock loads, the high resilience, the great flexibility, the low weight, the corrosion resistance.

Polypropylene and polyamide strappings are conventionally manufactured at the present time by extruding hot melt polymers through rectangular orifice dies, then the hot melt is quenched, stretched, cooled, and finally rolled in coils. Such straps are easily produced due to the easily crystallizable property of polypropylene and polyamides. Polymer chains can be oriented along the length of the strap in a single short stretching unit in order to promote its strength in that direction.

In general, the prior art concerning the production of extruded strap can only be applied to easily crystallizable polymers, such as polypropylene, polyolefins and polyamides. Straps made of such types of polymers are lacking several important properties in comparison to steel strapping. For instance, polyamide strapping is notch-sensitive, which gives rise to a low breaking point when its edge is cut. It is also susceptible to tearing by delamination initiated by surface cuts or scratches. Polypropylene strapping of high strength is prone to longitudinal splitting induced during sealing or cutting and, thus, inhibits the proper handling in continuous packaging operations.

In terms of strength, polyamides strapping is limited in the range of 53,000 to 61,000 p.s.i. Polypropylene strapping varies from a low strength of 34,100 p.s.i. to a high strength of 60,000 p.s.i. Therefore, the strappings made with these base materials only find their applications in the light packaging field.

The elongation at break of these conventional strappings vary widely from about 13 to about 40%. High strength polypropylene is the best for non-stretching applications but still elongates from 13 to 25% before breaking, as compared to 3% for steel strapping. Consequently, steel strapping has so far been favored for heavy bundling and transportation and wherever low elasticity is advantageous. In other words, the extruded plastic strapping using the conventional polypropylene, polyolefins and polyamides as the base materials, are found weak in comparison to steel strapping.

The extruded plastic straps of the prior art are made from easily crystallizable base materials, such as polypropylene, nylon, polyolefins, wherein the tensile strength of the strap can be readily increased to the maximum by crystallizing and orienting the molecular structure along the length of the strap.

It has been noted that the above-mentioned method of production is not suitable for slowly crystallizable materials, such as polyester, since the extrudate of the latter is primarily amorphous and lacks the strength to withstand high draw ratio. More particularly, it has been noted that the slow crystallization rate of polyester makes it impossible to obtain a polyester strap with a considerable degree of molecular orientation and crystallization in a single stretching step, as taught by the conventional anterior method of production. For example, the single stretching step suggested by the prior art produces an extruded polyester strap which possesses a tensile strength of less than 50,000 p.s.i. and an elongation at break in the order of 20 to 25%. Such strap is also clear and transparent, which indicates the predominance of the amorphous structure.

It has also been noted that in the production of extruded polyester strap, the presence of moisture geatly reduces the tensile strength of the final strap, due to the reverse hydrolysis of polyester at the elevated temperature employed for the extrusion. With a moisture content in the order of 5%, polyester resins produce a very weak strap. Besides, the use of dried polyester resin is also disadvantaged by the rapid or high rate of moisture pick-up, which results in uneven dryness of the supplied polyester, and thence, in the uneven quality of the strap from the beginning to the end of each load of polyester which is supplied to the extruder.

It is a general object of the present invention to provide an extruded plastic strap that obviates the foregoing disadvantages of the anterior extruded plastic straps, as compared with steel strapping and, in particular, to provide an extruded plastic strap which possesses high tensile strength and low elongation at break, and which is otherwise adapted to effectively replace steel strapping.

It is another general object of the present invention to provide a suitable method and a suitable system to form a polyester strapping.

It is a further object of the present invention to produce a strapping which is particularly suitable for packaging in medium and heavy duty applications and which can be mechanically fastened, such as by heat welding or by ultrasonic sealing for continuous packaging operations.

It is another object of the present invention to provide a method and a system for producing an extruded polyester strap which is characterized by high tensile strength in the longitudinal direction, low elongation before breaking, non-splitting in the transverse direction, good resistance to low and elevated temperatures and resistance to corrosion, weathering, bacteriological attack and moisture absorption.

It is still another general object of the present invention to provide a system adapted for multi-purpose extrusion of different polymers for extended and efficient use of the system.

It is another object of the present invention to provide an extrusion system with interchangeable stretching units and cooling units adapted to produce different combinations of these units and as many distinct systems.

It is another general object of the present invention to provide a method and a system producing the required crystallization and orientation of slowly crystallizable polymers predominantly in one direction along the length of the strap.

It is a further general object of the present invention to provide a method and a system to produce an extruded polyester strapping which is superior to anterior plastic strappings and comparable to steel strapping in terms of tensile strength and of elongation before breaking.

It is a more specific object of the present invention to provide a method and a system based on a new stretching technique suitable for polyester strap production and, more particularly, to produce polyester strap with optimum tensile strength.

It is a specific object of the present invention to provide an appropriate method of drying polyester while avoiding degradation of the latter.

It is a still further specific object of the present invention to provide a method and a system to produce an extruded linear aliphatic and aromatic polyester strap containing dicarboxylic acids and polymethylene glycols or an extruded strap of polyethylene terephthalate.

The above and other objects and advantages of the present invention will be better understood with the following detailed description of preferred embodiments thereof which are illustrated, by way of example, in the accompanying drawings, wherein.

Figure 1:
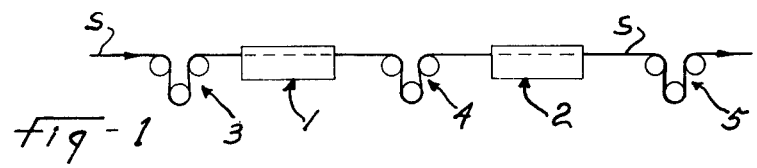
FIG. 1 is a schematic side elevation view of a two-step stretching system according to a first embodiment of the present invention.

The two-step stretching system of FIG. 1 is provided to produce stretching of the polyester which exceeds the 500% value which is conventionally obtained by a single step of stretching. The two-step stretching of the present invention allows to produce stretching between 5 to 1 and 12 to 1 relative to the fresh extrudate.

The stretching system of FIG. 1 illustrates a first stretching unit 1 and a second stretching unit 2 positioned between drawing roll sets 3, 4, and 5 provided to draw the strap S through the stretching units 1 and 2. The stretching units 1 and 2 may be of any conventional type and so are the drawing roll sets 3, 4, and 5. The draw ratios may be adjusted by varying the speed of the intermediate drawing roll set 4 and of the drawing roll set 5.

Figure 2:
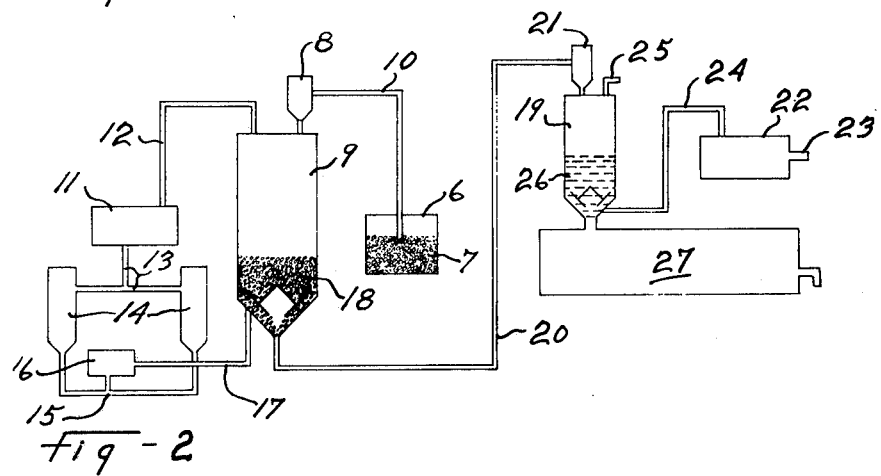
FIG. 2 is a schematic elevation view of a drying device according to the present invention and adapted to supply dried polyester to the extruder.

The pre-drying device or system of FIG. 2 includes a supply tank or container 6 of fresh polyester 7, or other appropriate polymers. A vacuum pump 8 transfers the fresh polyester 7 from the tank 6 to the dryer 9 through a tube or hose 10. A heater 11 takes the air from the top of the dryer 9 through a tube 12 and after heating thereof feeds it through tubes 13 to dessicant towers 14. The dried hot air passes by tubes 15 from the towers 14 to a collector 16 from which it is expelled by tubes 17 to the bottom of the dryer 9. Thus, a continuous upward flow of dried hot air may be maintained in the dryer 9 to dry the polyester 18 which passes in the latter.

The dried polyester 18 is transferred from the dryer 9 to a hopper 19 through a tube 20 and a vacuum pump 21. A heater 22 collects air by an intake 23 and feeds it through a tube 24 to the bottom of the hopper 19 which is provided with a vent 25 for exit of the air. This hot air from the heater 22 prevents moisture reabsorption by the polyester 26 in the hopper 19. This is made necessary due to the high rate of moisture absorption of the dried polyester. The polyester 26, or other polymer plastic which may be instead placed in the hopper 26, is dispensed in any known manner to an extruder 27 which is of appropriate type to extrude a strap of the known type for packaging.

Figure 3:
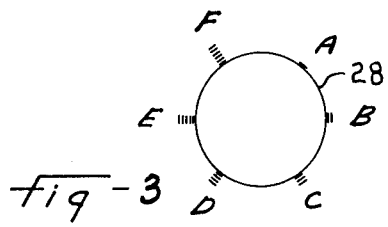
FIG. 3 is a schematic view of the end of a roll to explain the coiling of the produced strap thereon in accordance with the present invention.

FIG. 3 serves to explain a preferred winding technique according to which the finished strap is coiled in hexagonal pattern on large core rolls. As shown at A, B, C, D, E, and F, the starting point of each additional layer is angularly offset from the previous one by an angle of 60° around the circumference of a roll 28. In other words, the first strap layer starts at A; the second at B, etc. The pattern repeats itself after completion of six successive layers. With this hexagonal coiling pattern, each strap layer is supported regularly by six underlying layers.

Figure 4:
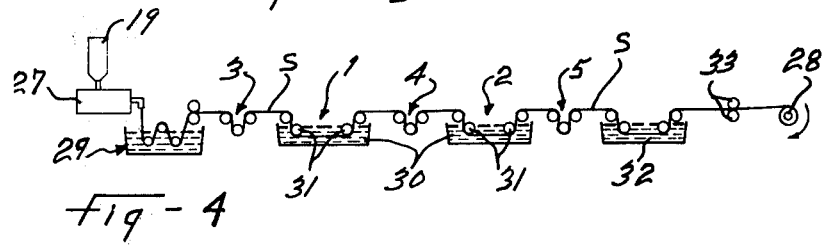
FIG. 4 is a schematic side elevation of a first embodiment of a strap producing system according to the present invention.
Figure 5:
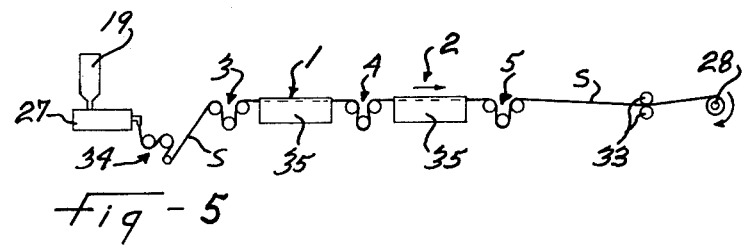
FIG. 5 is a schematic side elevation of a second embodiment of a strap producing system according to the present invention. The polyester employed is formed by the polymerization of terephthalate acid with ethylene glycol.

The strap extrusion systems shown in FIGS. 4 and 5 include each the hopper 19 and the extruder 27 used in operative association with the drying system of FIG. 2.

In the embodiment of FIG. 4, the extrudate issuing from the extruder 27 is passed through a quenching unit 29, of any appropriate construction, before passing through the two-step stretching assembly. In this embodiment, the stretching units 1 and 2 are of the wet or fluid type, in particularly using hot water baths 30 and idler rollers 31. The strap S is stretched a first time by the roll sets 3 and 4 and a second time by the roll sets 4 and 5. Finally, the strap is cooled in the cooling tank 32 under tension by the driven rolls 33. The strap is then coiled as aforedescribed on the roll 28.

In the embodiment of FIG. 5, the extrudate issuing from the extruder 27 is cooled through a chill roll assembly or set 34 to fix the shape of the strap S before passing the latter through the two stretching stages. In this case, the stretching units 1 and 2 are of the dry type and, more particularly, include each a radiant heater oven 35 through which the strap S is drawn. The strap S is thereafter cooled in the open air under tension during travel from the second radiant heater oven 35 through which the strap S is drawn. The strap S is thereafter cooled in the open air under tension during travel from the second radiant heater oven 35 to the driven rolls 33. Finally, the strap S is coiled on the roll 28.

EXAMPLE 1

Manufacturing of Polyester Extruded Strap by Wet Processing Method

Polyethylene terephthlate obtained by the polymerization of terephthalic acid and ethylene glycol is dried and crystallized to the moisture content of about 0.2% according to the drying technique mentioned above. The drying temperature is about 300° F (149° C) in four hours for the first 400 lbs (172 Kg) of polyester resin. The dried resin is taken out gradually from the bottom of the dryer and transferred to the heated hopper and the fresh resin is loaded at the top to assure a continuous supply of dried resin for processing. Dried resin is being kept from the moisture reabsorption by circulating hot air at 300° F (149° C) in the heated hopper.

The extrusion technique is well known by those skilled in the art. However, for polyester as in this invention, satisfactory extrudate can only be achieved through the precise temperature control, adequate heating and cooling, as well as satisfactory extrusion pressure. The melting temperature of polyester is relatively higher than other polymers from 245° C to 250°

C (473° F to 482° F) and the degrading temperature of polyester is about 300° C to 310° C (572° F to 590° F); thus, in general, the extruder temperatures should be limited in this range.

The extrudate is quenched in water to obtain adequate strength as well as the definite form of strap. The water level, the water temperature and the travelling length in the quenching tank have to be adjusted in connection with the extrusion rate in order to avoid strap deformation, strap size variation and the strap wavy motion. The freshly formed polyester strap in the quenching tank is transparently clear, which indicates predominance of the amorphous unoriented nature. In this example, the quenching water temperature is kept at about 50° C (122° F) and the travelling length is about 3 feet (91.5 cm) for an extrusion rate of about 65 feet per minute (19.8 m/min).

Then the quenched strap is passed through the first set of rolls 3, which rolls are of 9 inches (22.8 cm) in diameter and running at about 28 RPM, In the liquid stretching tank, the common form of liquid employed is water. However, through the knowledge of those skilled in the art, other liquids, such as ethylene dioxide, ethylene glycol, glycerol or their mixtures with water, can be used. In this example, water at its boiling temperature is employed. With a travelling length of about 10 feet (3m), polyester strap can be stretched up to 400% without breaking. The stretching at the boiling water temperature 100° C (212° F) induces and accelerates simultaneously crystallization and molecular orientation along the strap.

The stretched strap, then, is passed through the second stretching tank containing boiling water to promote the molecular crystallization and orientation. Additional stretching, orientation and crystallization can be successfully achieved. In this example, the additional draw ratio varies from 2 to 1, to 2.5 to 1. This makes the total draw ratio of the two stretching units from 8 to 1, to 9 to 1. The arrangement of the stretching ratio in the two stretching units is dependent upon the travelling length as well as the stretching temperature. This stretching technique provides an efficient means to achieve the highest strength in the axial direction by optimized orientation and crystallization of the polyester.

The strap leaving the second stretching tank is cooled either in water or in air, and finally rolled in coils.

Polyethylene terephthalate strap obtained by this production method possesses a tensile strength of above 75,000 p.s.i. and elongation at break of 8%. The strap is milky white, strong in the transverse direction and flexible.

EXAMPLE 2

Manufacturing of Polyester Extruded Strap by Dry Processing Method

In the dry processing method according to this invention, polyester resin of Example 1 is dried, transferred to the heater hopper and melted in the extruder in the same way as mentioned in the Example 1. The extrudate is cooled by a set of chill rolls made with a highly smooth chromium surface to avoid sticking of the hot extrudate. The chill rolls are cooled by circulating cold water or air inside their cores. The hot extrudate is properly chilled to form a strap with adequate strength for subsequent stretching, orientation and crystallization. Then, the chilled strap is passed through the two radiant heater ovens to obtain satisfactory stretching orientation and crystallization. Finally, the strap is cooled under tension in the ambient air.

EXAMPLE 3

Polypropylene Strap Production in Multi-Purposed Extrusion System

Polypropylene extruded strapping can be manufactured by the combination of the wet and dry stretching technique. Equipment employed is that employed in the Examples 1 and 2.

In the polypropylene strap processing, resin is loaded in the heated hopper to facilitate the melting in the extruder. Since the presence of moisture does not affect the quality of strap, prior drying is not necessary. The resin is melted in the extruder in the temperature range of about 420° F to 430° F (216° C – 221° C) and is quenched in water at a temperature of about 110° F (43° C) for an extrusion rate of about 26 feet per minute (8 m/min). Then, the quenched strap is passed through the two stretching radiant heater ovens at a temperature of about 250° F (121° C) to acquire a total stretching from 9 to 1 to 12 to 1, depending on the desired strength of the final strap. Since the crystallization of polypropylene is fast, and the crystallization rate is quite appreciable, even at the temperature of the quenching tank, the strap getting into the stretching section has sufficient strength for any stretching ratio. The radiant heater stretchings employed in connection with water quenching, as in this case, is due to the hydrophobic nature of polypropylene. Water droplets cannot attach to the surface of the newly formed polypropylene strap. Thus, there is no possibility of forming an uneven, crater-like strap surface due to the evaporation of water drops in the radiant heater stretching section.

This last example is used to show the multi-purpose use of the extrusion system wherein the cooling may be done by either of the two assemblies 29 and 34 and the stretching may be done by either the dry or the wet stretching technique.

We claim:

1. A process to produce high tensile polyester extruded strap using as a starting material a polyester resin obtained from the polymerization of terephthalic acid and ethylene glycol, said process comprising the steps of drying said polyester resin while in granular form to a final moisture content of about 0.2% by circulating hot dried air at about 300° F. through the granular polyester resin, keeping the dried polyester resin in a heated hopper to prevent moisture reabsorption by the polyester resin, said polyester resin being kept dried in the hopper by circulating hot air through the polyester resin at about 300° F., extruding the polyester resin in a nondegrading temperature range of between 482° F to 572° F., quenching the extrudate by cooling the same to about 122° F. and stretching the extrudate in two consecutive steps at a temperature of about 212° F., the draw ratio in the first stretching step being about 4 to 1 and the stretching ratio in the second stretching step varying between 2 to 1 and 2.5 to 1 to obtain a total stretching ratio varying between 8 to 1 and 9 to 1, the resulting polyester strap having a tensile strength of at least 75000 p.s.i. and an elongation at break of 8%.

2. A process as claimed in claim 1, wherein quenching of the extrudate is carried out by moving the extrudate in contact with a chill roll cooled by circulating cold fluid therethrough and the stretching of the extrudate is carried out while passing the same through two consecutive radiant heating ovens.

* * * * *